(12) United States Patent
Fujikawa et al.

(10) Patent No.: US 12,024,227 B2
(45) Date of Patent: Jul. 2, 2024

(54) INTERLOCKING VEHICLE BEAM ASSEMBLY

(71) Applicant: Shape Corp., Grand Haven, MI (US)

(72) Inventors: Kazutoyo Fujikawa, Atsugi (JP); Tadashi Chikami, Atsugi (JP)

(73) Assignee: Shape Corp., Grand Haven, MI (US)

( * ) Notice: Subject to any disclaimer, the term of this patent is extended or adjusted under 35 U.S.C. 154(b) by 261 days.

(21) Appl. No.: 17/697,722

(22) Filed: Mar. 17, 2022

(65) Prior Publication Data

US 2022/0297758 A1    Sep. 22, 2022

Related U.S. Application Data

(60) Provisional application No. 63/162,302, filed on Mar. 17, 2021.

(51) Int. Cl.
| | |
|---|---|
| *B62D 21/15* | (2006.01) |
| *B62D 27/02* | (2006.01) |
| *B62D 21/00* | (2006.01) |
| *B62D 21/02* | (2006.01) |

(52) U.S. Cl.
CPC .......... *B62D 21/15* (2013.01); *B62D 27/023* (2013.01); *B62D 21/00* (2013.01); *B62D 21/02* (2013.01)

(58) Field of Classification Search
CPC ...... B62D 27/023; B62D 21/00; B62D 21/02; B62D 21/15
USPC ................. 296/203.01, 204, 203.02, 187.08
See application file for complete search history.

(56) References Cited

U.S. PATENT DOCUMENTS

| | | | |
|---|---|---|---|
| 5,285,612 A | * | 2/1994 | Johnson .................. E04H 12/02 52/655.1 |
| 2004/0130166 A1 | | 7/2004 | Trancart et al. |
| 2007/0095001 A1 | * | 5/2007 | Heatherington .... B21C 37/0815 52/837 |
| 2011/0298245 A1 | * | 12/2011 | Jarocki .................. B62D 21/03 296/193.07 |
| 2014/0361558 A1 | * | 12/2014 | Malkowski ............. B60R 19/18 29/897.2 |
| 2020/0164820 A1 | * | 5/2020 | Baas ...................... B23K 26/08 |

OTHER PUBLICATIONS

International Search Report for PCT/US2022/020802 mailed Jul. 15, 2022; 3 pp.

* cited by examiner

*Primary Examiner* — Amy R Weisberg
*Assistant Examiner* — Dana D Ivey
(74) *Attorney, Agent, or Firm* — Bodman PLC (57) ABSTRACT

An interlocking beam assembly for a frame assembly of a vehicle that includes an upper beam and a lower beam. The upper beam includes an upper hollow section integrally formed with a lower hollow section and a common wall shared by the upper and lower hollow sections. A notch is disposed in the lower hollow section of the upper beam at a select portion along a length of the upper beam. The notch is defined at cut edges along a bottom wall and side walls of the lower hollow section. A lower beam is configured to extend substantially perpendicular to the upper beam and attach in the notch in the upper beam between the cut edges of the side walls in a manner that bridges load paths across the notch in the upper beam.

18 Claims, 8 Drawing Sheets

INTERLOCKING VEHICLE BEAM ASSEMBLY

CROSS-REFERENCE TO RELATED APPLICATION

This application claims benefit and priority under 35 U.S.C. § 119(e) of U.S. provisional application Ser. No. 63/162,302, filed Mar. 17, 2021, the contents of which are hereby incorporated herein by reference in its entirety.

TECHNICAL FIELD

The present disclosure relates to connections formed between beams in a vehicle frame or frame assembly, and more particularly to vehicle frame assemblies and subassemblies with connections between hollow or partially hollow beam components.

BACKGROUND

Vehicle frames and chassis structures are designed to support the vehicle and transmit loads and impact forces over sections of the frame, while also absorbing certain loads and levels of impact forces. In doing so, the vehicle frame can function to prevent distances of deflected inboard intrusion into the vehicle in accordance with insurance requirements and other regulatory requirements. Accordingly, it is common for beams that connect together in forming a vehicle frame to be rigidly attached together.

SUMMARY

One aspect of the disclosure provides an interlocking beam assembly for a vehicle that includes a first beam and a second beam attached together in a notched connection configuration that bridges an axial load path across the notched connection and provides increased vehicle package space proximate the associated beams and connection. The first beam is a single integrally formed beam that defines a transverse cross-sectional shape extending continuously along a length of the first beam. The transverse cross-sectional shape of the first beam includes hollow sections that each enclose an elongated cavity. The hollow sections include a notched hollow section that has a notch disposed transverse to the length of the first beam at a select portion of the length of the first beam. The notch is defined at cut edges along side walls of the notched hollow section. The second beam extends substantially orthogonal to the first beam and is attached in the notch in the first beam between the cut edges of the side walls of the notched hollow section. In some examples, the first beam includes a load path along the length of the first beam, such that the second beam bridges the load path across the notch in the notched hollow section of the first beam.

Implementations of the disclosure may include one or more of the following optional features. In some implementations, the second beam has a transverse cross-sectional shape extending continuously along a length of the second beam, such as where the transverse cross-sectional shape encloses a plurality of cavities along the length of the second beam. In some examples the second beam includes a second notch, such as where the second beam includes a second notched hollow section with the second notch disposed transverse to the length of the second beam at a select portion of the length of the second beam. The second notch may be defined at cut edges along side walls of the second notched hollow section. The selection portion of the length of the first beam may be attached in second notch of the second beam.

In additional implementations, the first beam is configured to extend along a width direction of the vehicle and the second beam is configured to extend along a length direction of the vehicle. In some implementations, an outer surface of the second beam is welded to the cut edges in the notched hollow section of the first beam. Further, in some examples, the first beam includes a metal sheet that is formed to define the plurality of hollow sections. The metal sheet, in some implementations, includes (i) a central segment that forms a shared center wall between the a notched hollow section and an adjacent hollow section and (ii) outer segments that extend from opposing sides of the central segment of the metal sheet and are formed to define the notched hollow section and the adjacent hollow section. As such, the side walls of the notched hollow section that have the cut edges providing the notch may be disposed along the outer segments of the metal sheet.

Another aspect of the disclosure provides an interlocking beam assembly for a frame assembly of a vehicle that includes an upper beam and a lower beam. The upper beam includes an upper hollow section integrally formed with a lower hollow section and a common wall shared by the upper and lower hollow sections. A notch is disposed in the lower hollow section of the upper beam at a select portion along a length of the upper beam. The notch is defined at cut edges along a bottom wall and side walls of the lower hollow section. A lower beam is configured to extend substantially perpendicular to the upper beam and attach in the notch in the upper beam between the cut edges of the side walls.

In some implementations, the lower beam has a left-side hollow section integrally formed with a right-side hollow section and a common wall shared by the left-side and right-side hollow sections. A second notch may be disposed in the right hollow section of the upper beam at a select portion along a length of the lower beam. The second notch may be defined at cut edges along a right side wall and upper and lower walls of the right hollow section. A lower hollow section of the upper beam is then configured to attach in the second notch between the cut edges of the right side wall.

A further aspect of the disclosure provides a frame assembly for a vehicle that has a floor panel configured to define a cabin area of the vehicle above the floor panel. An upper beam is disposed along an upper surface of the floor panel and includes an upper hollow section integrally formed with a lower hollow section and a common wall shared by the upper and lower hollow sections. A notch is disposed in the lower hollow section of the upper beam at a select portion along a length of the upper beam. The notch is defined at cut edges along a bottom wall and side walls of the lower hollow section. A lower beam is disposed along the upper surface of the floor panel and attach in the notch in the upper beam between the cut edges of the side walls. In some examples, a battery tray may be disposed below or integrated with the floor panel.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

The present disclosure relates generally to a vehicle frame assembly, subassemblies, and components thereof. Embodiments of the present disclosure provide technical solutions to a number of technical problems in the art. For example, with the incorporation of battery trays in electric and hybrid electric vehicles in the frame area between opposing rocker sections, it is desirable for the side impact intrusion distance to be reduced in order to maximize available battery storage volume in the battery trays. To reduce the inboard distance of a side impact intrusion, cross members can be attached between the rocker sections. However, cross members can reduce vertical package space for vehicle battery trays and when otherwise incorporated above a floor panel can undesirable occupy interior floor space of the vehicle. Further, with such specification reduction of rocker sections, the longitudinal load transfer in the vehicle can be improved with the addition of longitudinal beams along the floor panel, such as at locations inboard from the rocker sections.

Figure 6:
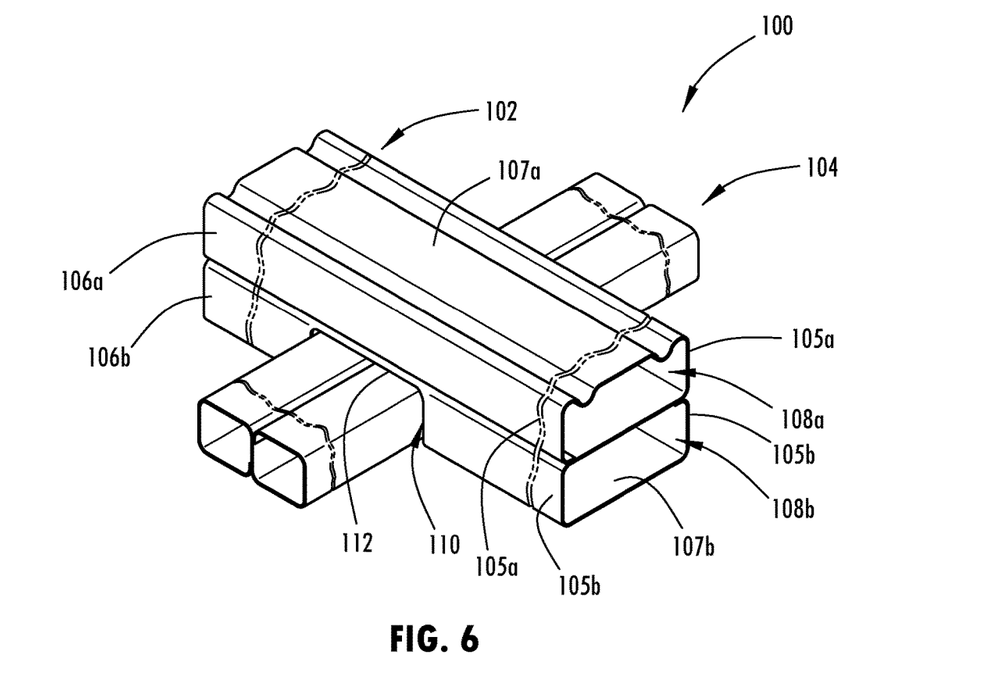
FIG. 6 is a perspective view of an example of an interlocking beam assembly, showing that the illustrated portions of the beams have lengths extending beyond what is shown.

Referring now to the drawings and the illustrative examples depicted therein, an interlocking beam assembly, such as beam assemblies 100 (FIGS. 6-6B), 200 (FIGS. 7-10), 300 (FIGS. 16-16B), for a vehicle 10 includes a first beam 102, 202, 302 and a second beam 104, 204, 304 attached together in a notched connection configuration that bridges an axial load path across the notched connection and provides increased vehicle package space proximate the associated beams and connection. Such attachment may be in the form of welding, adhesive, fasteners, or other positive and fixed mechanical attachment. As shown in FIG. 6, the first beam 102 is a single, integrally formed beam that defines a transverse cross-sectional shape extending generally continuously along a length of the first beam 102. The transverse cross-sectional shape of the first beam 102 includes hollow sections 106a, 106b that each enclose an elongated cavity 108a, 108b. The hollow sections include a notched hollow section, such as the lower section 106b shown in FIG. 6, defined by a notch 110 disposed transverse to the length of the beam 102 at a select portion of the length of the beam 102. The notch 110 is defined at cut edges 112 along side walls of the notched hollow section. To form the notched connection in the example shown in FIG. 6, the second beam 104 that extends substantially orthogonal to the first beam 102 is attached in the notch 110 in the first beam 102 between the cut edges 112 of the side walls of the notched hollow section. Additional examples of such a notched connection configuration are shown and further described herein.

Figure 1:
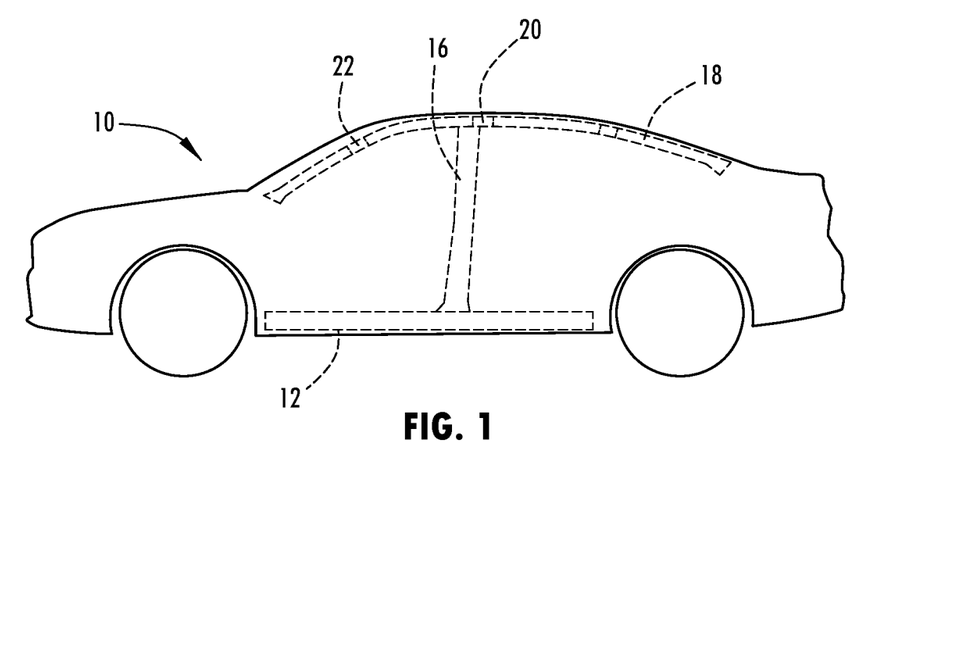
FIG. 1 is a schematic side elevation view of an exemplary vehicle showing components of a frame assembly.
Figure 2:
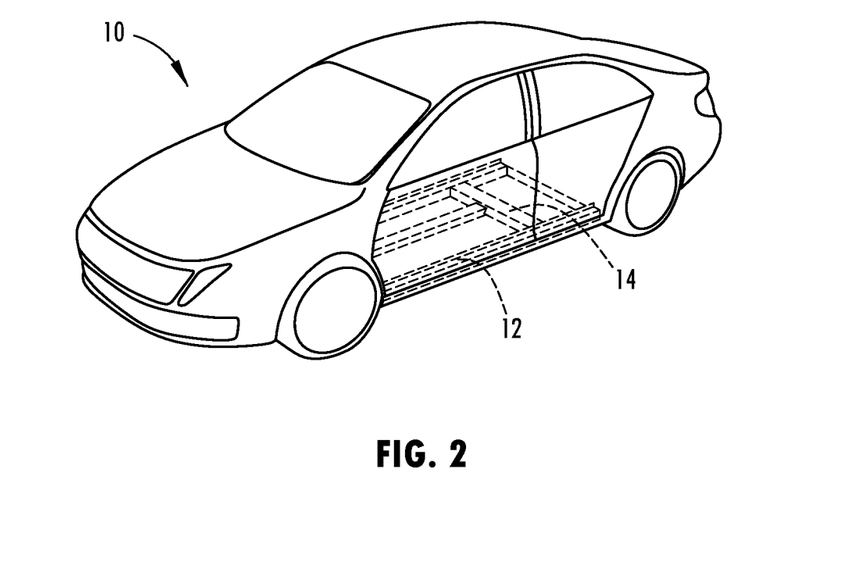
FIG. 2 is a perspective view of an exemplary vehicle and associated frame assembly.
Figure 3:
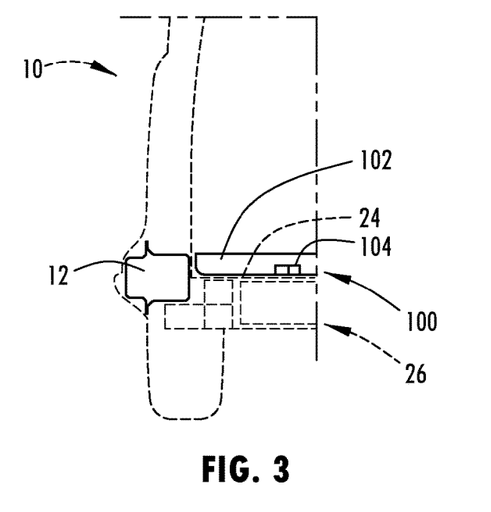
FIG. 3 is a cross-sectional view of an exemplary side region of a vehicle taken transverse to a length of the vehicle and showing components of a frame assembly.
Figure 4:
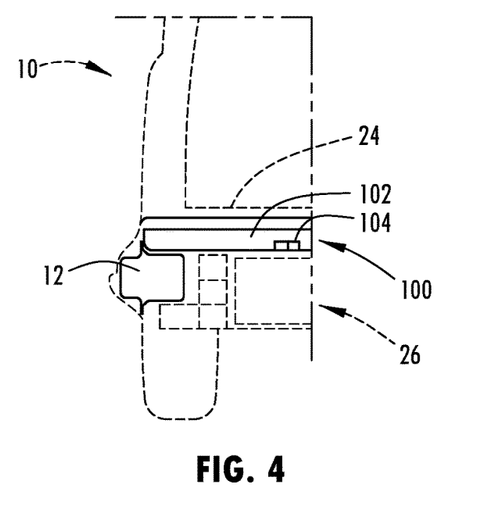
FIG. 4 is a cross-sectional view of another exemplary side region of a vehicle taken transverse to a length of the vehicle and showing components of a frame assembly.
Figure 5:
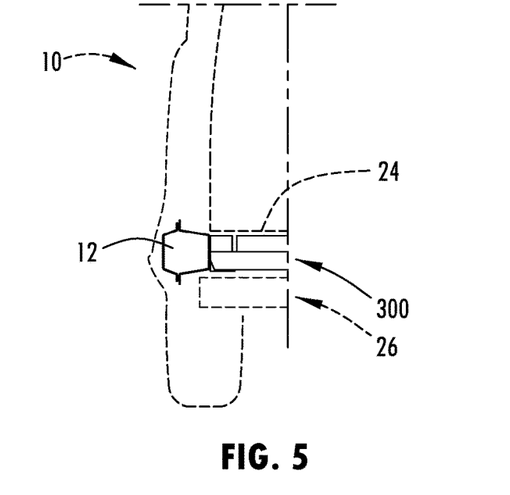
FIG. 5 is a cross-sectional view of a further exemplary side region of a vehicle taken transverse to a length of the vehicle and showing components of a frame assembly.
Figure 5A:
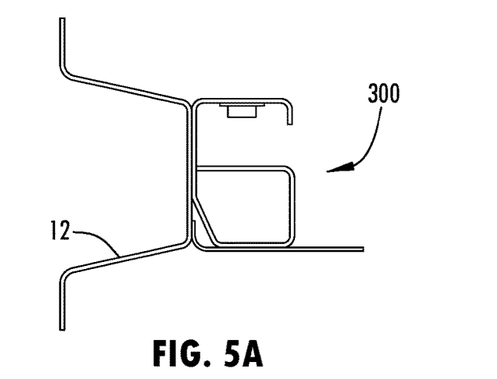
FIG. 5A is a further cross-sectional view of the side region shown in FIG. 5.

As shown in FIGS. 1 and 2, the vehicle 10 may incorporate an interlocking beam assembly at various and multiple connection points on the vehicle frame assembly. For example, as shown in FIG. 1, the vehicle rocker section 12 that extends in the length direction of the vehicle 10 may incorporate a beam that is joined in a notched configuration with a laterally extending beam, such as a cross member 14 or the like, such as shown in FIG. 2. In other examples, the rocker section 12 include a beam that is joint in a notched configuration with a vertically extending beam, such as pillar 16 or the like. Further, vehicle 10 may include roof rails 18 that are connected in a notched configuration, such as with roof bows 20 or a header 22. As also shown in FIGS. 3-5, the rocker section 12 of a vehicle 10 is generally positioned along an outboard side of the vehicle frame and near or below the floor panel 24 of the vehicle 10 that defines at least a portion of the occupant cabin and is used to support occupants, cargo, and the like. In such examples, it is shown that the interlocking beam assembly may be disposed above the floor panel 24 (FIG. 3), below the floor panel 24 (FIG. 4), or otherwise may be integrated with the floor panel in other examples, such as by being partially above and partially below the floor panel. Also, the interlocking beam assembly may be disposed along or otherwise integrated with the rocker section above or below the floor panel, such as shown in FIG. 5.

The interlocking beam assembly may be incorporated into vehicle frame or chassis, and in such an examples individual vehicle batteries may be directly attached to the vehicle frame, such as to the interlocking beam assembly. It is also contemplated that the interlocking beam assembly may be integrated into the other vehicle structures.

Further, as shown in FIGS. 3-5, the interlocking beam assembly may be incorporated when the vehicle has a battery tray 26, such as for electric or hybrid electric vehicles. Thus, the interlocking beam assembly in some examples may be integrated into the frame structure of the battery tray. The batter tray 26 may be mounted below the floor panel 24 and function to enclose battery or batteries that are at least partially used to operate a propulsion system of the vehicle 10, such as a traction battery or battery modules or the like. The battery tray 26 may be supported generally between the front and rear wheels of the vehicle 10 to distribute the battery weight and establish a low center of gravity for the vehicle 10. For purposes of this disclosure, the vehicle may be any type of land motor vehicle, such as a car, truck, bus, van, sport utility vehicle, or the like, including those used for passenger travel, cargo shipping, or any other personal, governmental, or commercial purposes. Thus, it is understood that the interlocking beam assembly may also be advantageously incorporated in vehicles with internal combustion engines and the sole or primary propulsion system.

As shown in FIGS. 3 and 4, the interlocking beam assembly is arranged with the first beam 102 generally disposed above or over the second beam 104, such that the first beam in this arrangement may be referred to as the upper beam and the second beam 104 may be referred to as the lower beam. In addition, the first beam 102 in FIGS. 3 and 4 extends along a width direction of the vehicle 10 and the second beam 104 extends along a length direction of the vehicle 10. As such, the lower or second beams 104 in these examples may be used to carry loads longitudinally on the vehicle 10, such as to supplement the longitudinal support provided by the rocker section 12. Also, the upper or first beams 102 in these examples are used to carry loads laterally on the vehicle 10, such as to prevent side impact intrusion at the rocker section 12 inboard, such as into or toward the battery tray 24.

As shown in FIG. 6, the notch 110 in the first beam 102 is defined at cut edges 112 along side walls 105*b* and a bottom wall 107*b* of the lower or notched hollow section 106*b*. The notch 110 removes a piece of the side walls 105*b* as well as a piece of the bottom wall 107*b* below the cut edges 112 in the side walls 105*b*, such as shown in FIG. 6. In additional examples, the bottom wall at the notch may be partially or completely in tact, so that the notch provides to a complete or partial aperture through the side walls of the second beam. In the case of removing the bottom wall 107*b* at the notch 110, as shown in FIG. 6, the cut edges 112 on the bottom wall 107*b* may be disposed in the same vertical plane as the cut edges 112 of the side walls 105*b*. In the examples where the bottom wall at least partially remains in tact at the notch (or aperture), the second beam may be slid through the notch or aperture, such as to be similarly disposed in a substantially orthogonal orientation relative to the first beam.

Figure 6A:
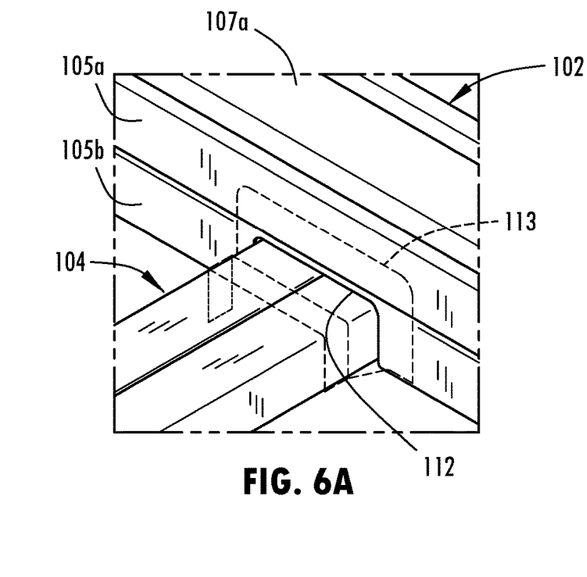
FIG. 6A is an enlarged view of the connection between the beams of the interlocking beam assembly of FIG. 6 showing an optional connection bracket.
Figure 6B:
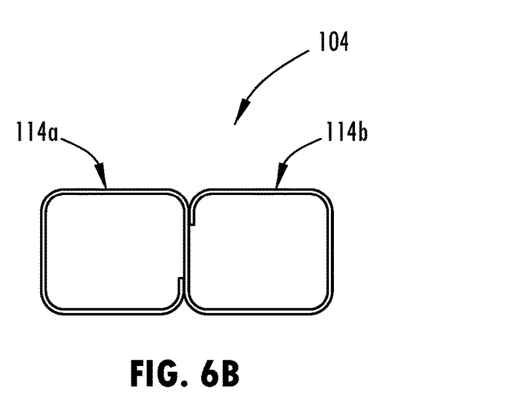
FIG. 6B is a cross-sectional view of a lower beam of the beam assembly of FIG. 6.

As further shown in FIGS. 6-6B, the second beam 104 has a consistent cross-sectional shape along its length that is uninterrupted by a notch. As such, the notch 110 in the first beam 102 is formed with a shape that mates to the cross-sectional shape of the second beam, as shown in FIG. 6B. For example, the cross-sectional shape of the second beam 104 may be formed with a metal sheet that is formed, such as via roll forming, to impart bends along the length of the second beam and define two adjacent hollow sections 114*a*, 114*b*. More specifically, the metal sheet of the second beam 104 may be considered segmented between the longitudinal bends to define a central segment and outer segments that integrally extend from opposing ends. The central segment forms a shared center wall between the adjacent hollow sections 114*a*, 114*b*. The outer segments are formed in the same rotational direction about the central segment to enclose the adjacent hollow sections 114*a*, 114*b* of the second beam 104.

Figure 7:
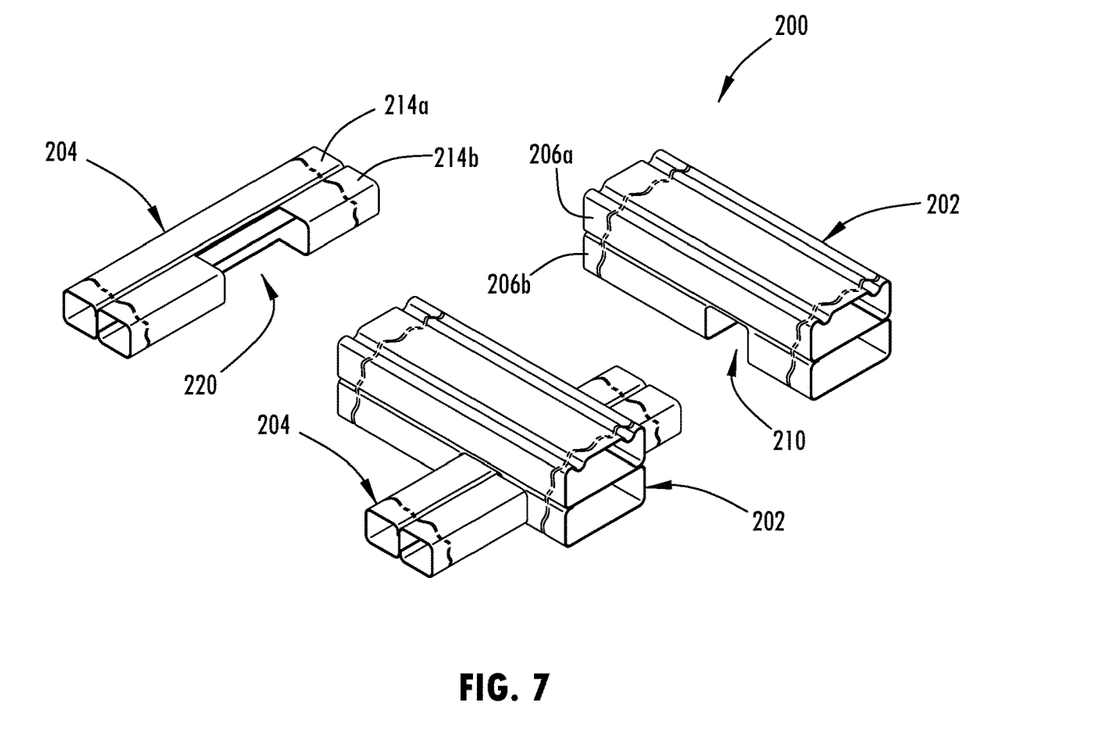
FIG. 7 is an exploded perspective view of another exemplary interlocking beam assembly.

Referring now to FIGS. 7-10, another example of the interlocking beam assembly is shown having a double-notch interlocking configuration. In doing so, the second beam 204 may have a transverse cross-sectional shape extending generally continuously along a length of the second beam, such as where the transverse cross-sectional shape include tubular sections 214*a*, 214*b* that each enclose a cavity 216*a*, 216*b* along the length of the second beam 204. As shown in FIG. 7, the second beam 204 includes a second notch 220, such as where the second beam includes a second notched hollow section 214*b* with the second notch 220 disposed transverse to the length of the second beam 204 at a select portion of the length of the second beam 204. The second notch 220 may be defined at cut edges 222 along side walls of the second notched hollow section 214*b*. The selection portion of the length of the first beam may be attached in second notch of the second beam.

Figure 10A:
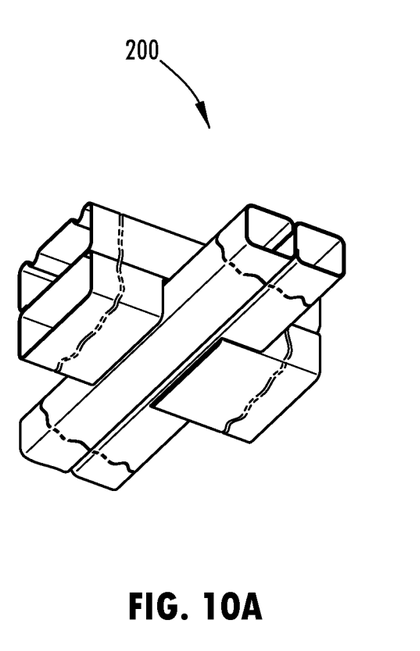
FIG. 10A shows a bottom perspective views of the interlocking beam assembly of FIG. 8 showing exemplary weld locations.
Figure 10B:
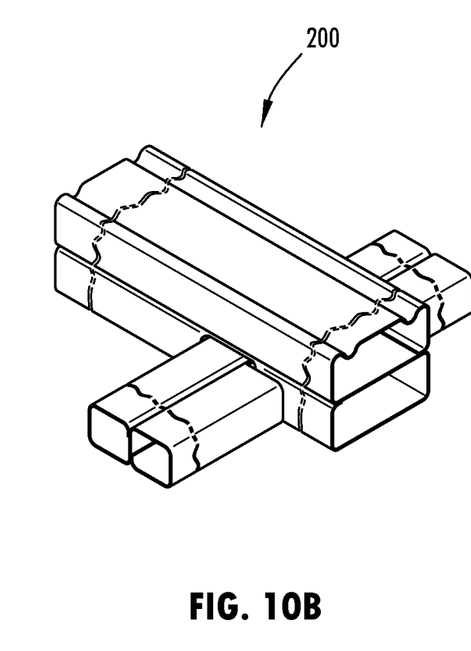
FIG. 10B shows a top perspective views of the interlocking beam assembly of FIG. 8 showing exemplary weld locations.
Figure 11:
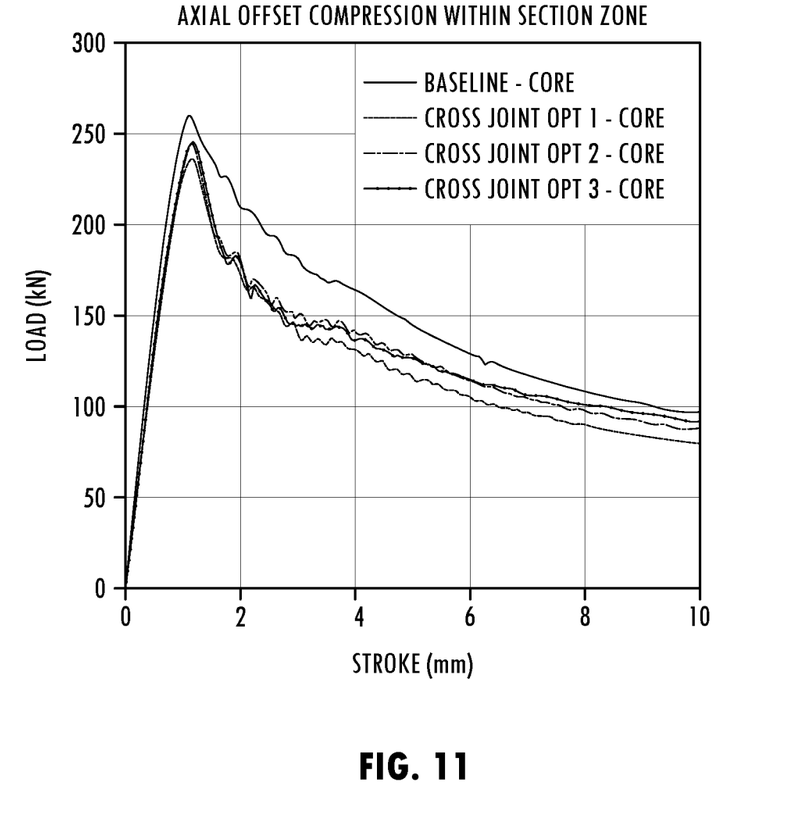
FIG. 11 shows a chart of axial offset compression loading of a baseline example in comparison with multiple examples of interlocking beam assemblies.
Figure 12:
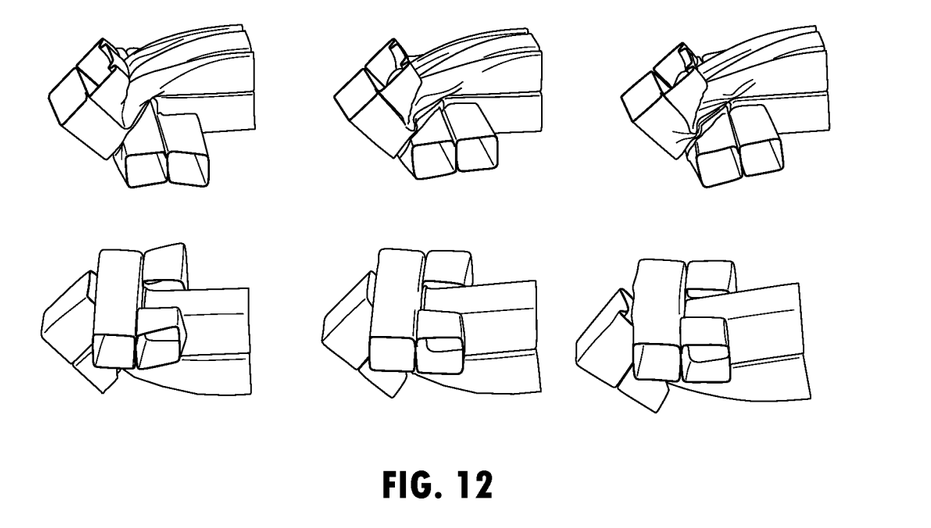
FIG. 12 shows upper and lower perspective views the multiple examples of the interlocking beam assemblies of FIG. 11 in a deformed state from such compression loading.
Figure 13:
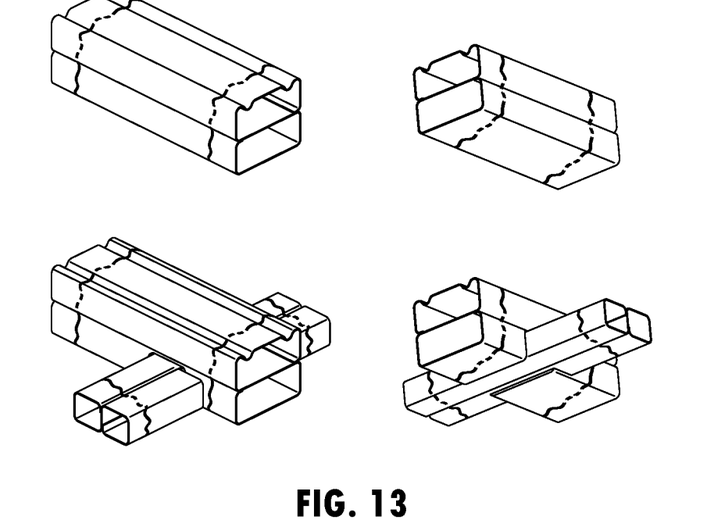
FIG. 13 shows perspective views of the examples reflected in the chart in FIG. 14.
Figure 14:
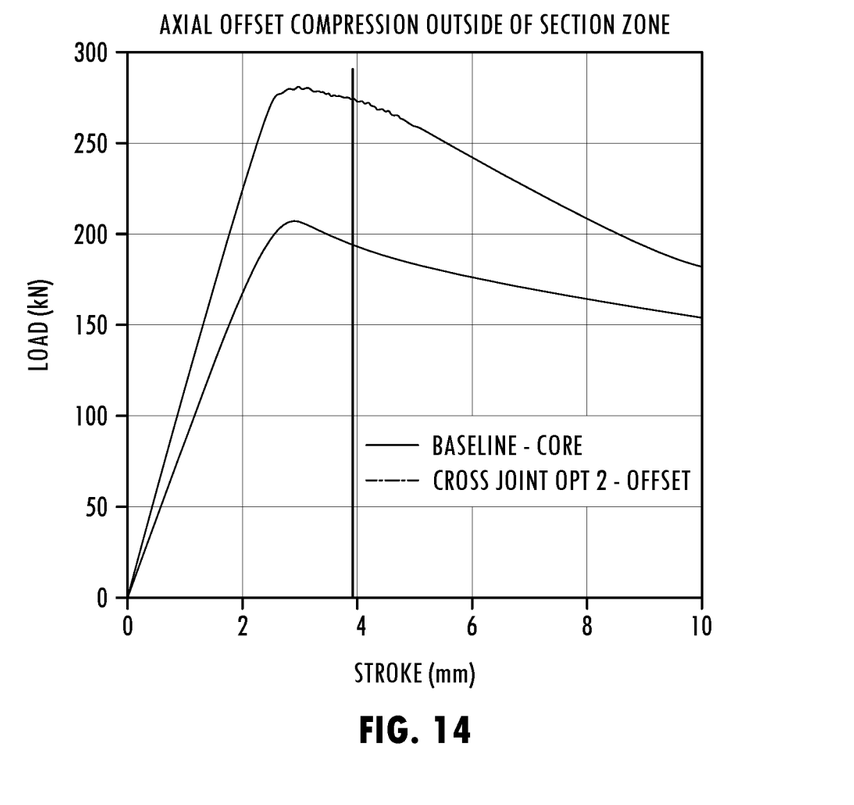
FIG. 14 shows a chart of axial offset compression loading of a baseline example compared to an example of an interlocking beam assembly.

In some examples, such as shown in FIGS. 10A, 10B, and 12, an outer surfaces of the first and second beams 202, 204 may be welded to the cut edges 212, 22 in the notched hollow sections of the respective beam. In addition or in the alternative to welding, the interlocking beam connection may be secured with a bracket, such as the optional connection bracket 113 shown in FIG. 6A which may be referred to as a saddle bracket, that is secured to each beam by one or a combination of fastening features, including welding, adhesive, fasteners, and the like. The saddle bracket may increase the surface area between the connection interface to provide additional welding surface area, such as a longer seam than the seam at the nested connection without a bracket.

Figure 8:
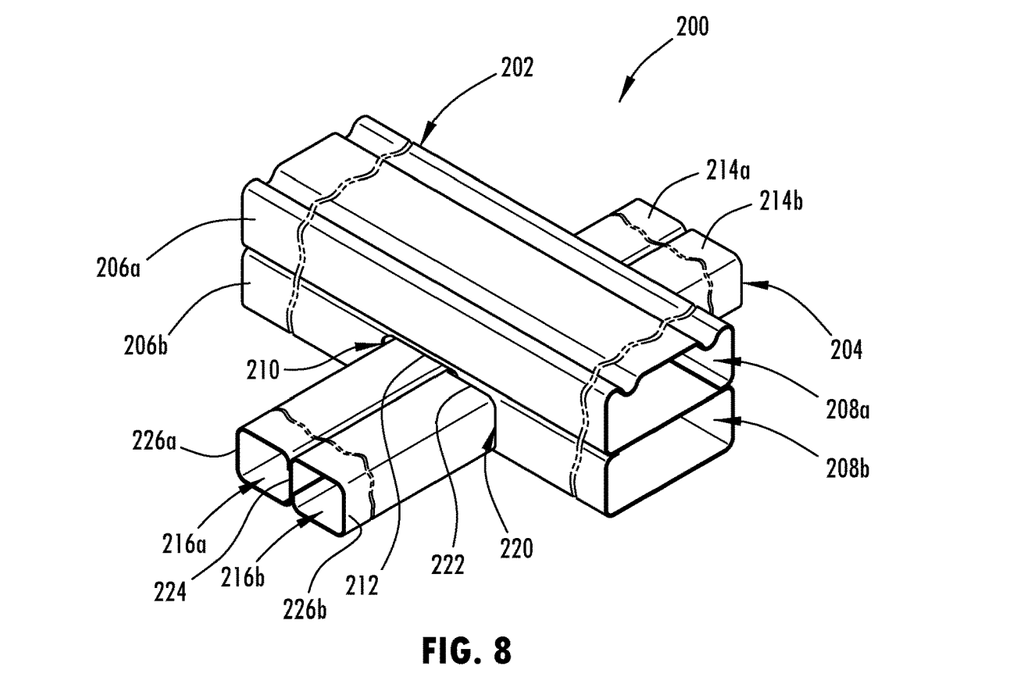
FIG. 8 is a perspective view of an example of an interlocking beam assembly.

Also, one or both of the beams may be integrally formed as a single piece of metal. As shown in the illustrated examples of FIGS. 3-15B, the beams are made with a metal sheet that is formed, such as by roll forming or stamping, to define a cross-sectional shape that has the multiple hollow sections. As shown in FIG. 8, the metal sheet includes a central segment 224 that forms a shared center wall between the notched hollow section 214*b* and the adjacent hollow section 214*a*. The metal sheet also includes outer segments 226*a*, 226*b* that extend from opposing sides of the central segment 224 of the metal sheet and are formed to respectively define the notched hollow section 214*b* and the adjacent hollow section 214*a*. As such, the side walls of the notched hollow section that have the cut edges providing the notch may be disposed along the outer segments of the metal sheet. In addition to the mono-leg cross-sectional shape shown herein, the beams may include various additional cross-sectional shapes and designs.

Figure 9:
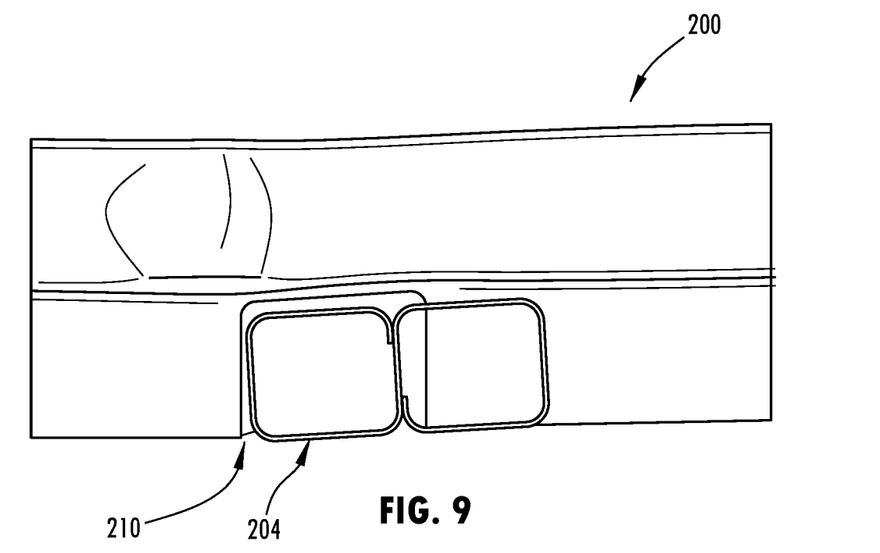
FIG. 9 is an elevation view of the interlocking beam assembly of FIG. 8.

Also, some examples of the beam include a load path along the length of the beam, where the beam that fills the notch is in close contact and bridges the load path across the notch in the notched hollow section of the beam. Specifically, the section of the beam that fills the notch includes a tubular wall that provides side walls against the cut edges of the notch and an outer wall that generally aligns with the other wall section missing from the notch, such as shown in FIG. 9 with the lower beam having a lower wall on tubular section that fills the notch in the upper beam to bridge the notch or otherwise transfer the load path that travels along the lower wall of the upper beam through the notch. Specifically, the axial loading forms stress along the lower wall of the upper beam that bridges the notch by transmitting the stress to the lower wall on the opposing side of the notch.

In some implementations, the lower beam has a left-side hollow section integrally formed with a right-side hollow section and a common wall shared by the left-side and right-side hollow sections. A second notch may be disposed in the right hollow section of the upper beam at a select portion along a length of the lower beam. The second notch may be defined at cut edges along a right side wall and upper and lower walls of the right hollow section. A lower hollow section of the upper beam is then configured to attach in the second notch between the cut edges of the right side wall.

A further aspect of the disclosure provides a frame assembly for a vehicle that has a floor panel configured to define a cabin area of the vehicle above the floor panel. An upper beam is disposed along an upper surface of the floor panel and includes an upper hollow section integrally formed with a lower hollow section and a common wall shared by the upper and lower hollow sections. A notch is disposed in the lower hollow section of the upper beam at a select portion along a length of the upper beam. The notch is defined at cut edges along a bottom wall and side walls of the lower hollow section. A lower beam is disposed along the upper surface of the floor panel and attach in the notch in the upper beam between the cut edges of the side walls. In some examples, a battery tray may be disposed below or integrated with the floor panel.

Figure 15:
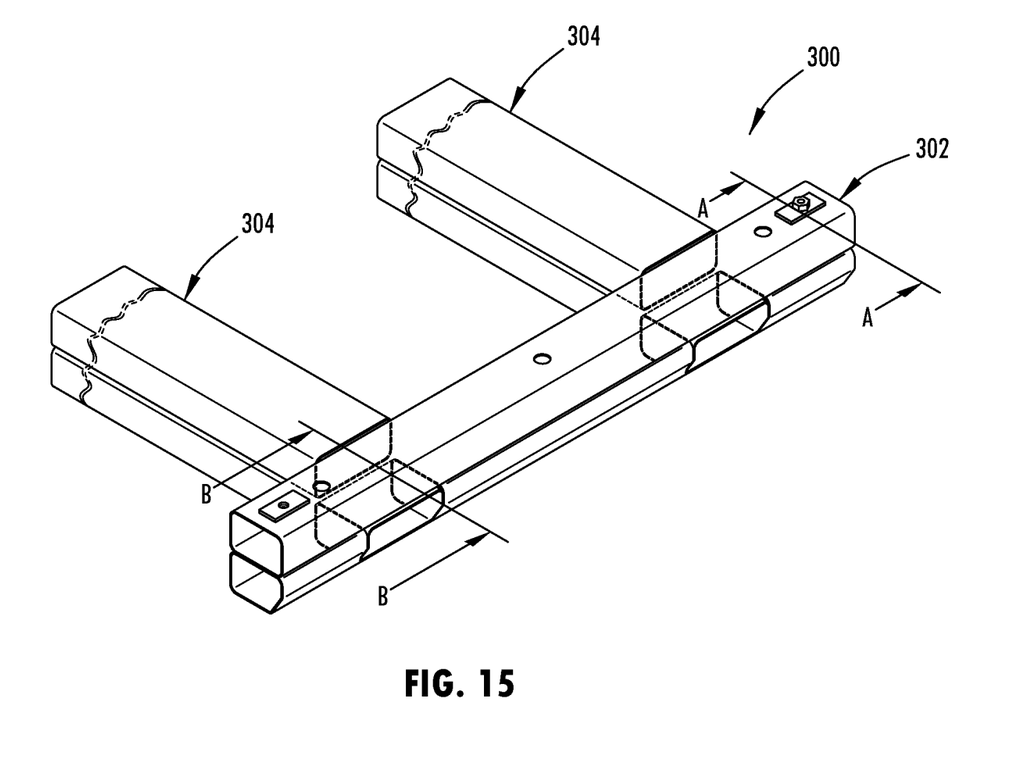
FIG. 15 is a perspective view of a further example of an interlocking beam assembly.
Figure 15A:
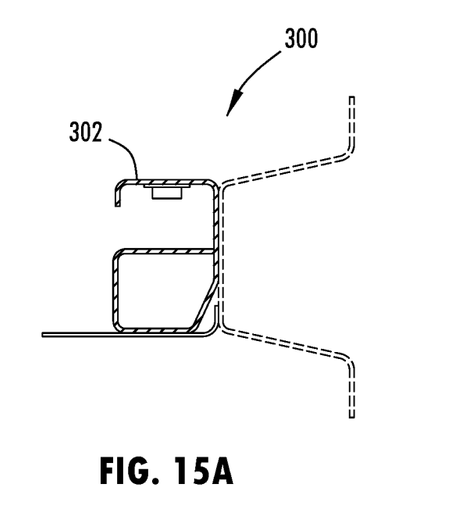
FIG. 15A is a cross-sectional view of the interlocking beam assembly of FIG. 15 taken at line A-A.
Figure 15B:
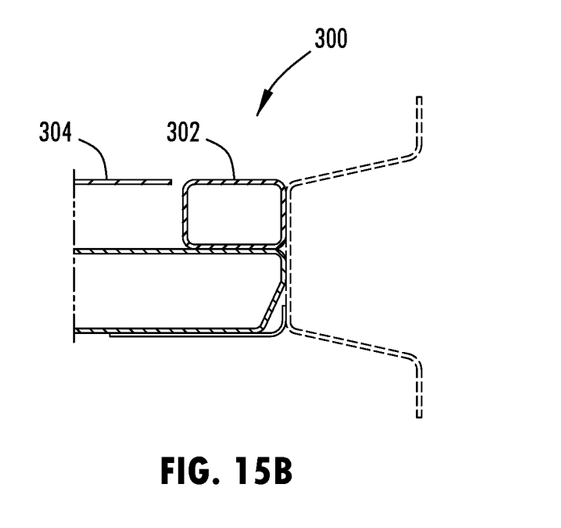
FIG. 15B is a cross-sectional view of the interlocking beam assembly of FIG. 15 taken at line B-B.

Referring now to FIGS. 15-15B, the additional example of the interlocking beam assembly 300 shows the upper beam 302 as the floor side member outer and the lower beams 304 as floor cross members that engage and attach within notches in the lower tubular section of the upper beam 302. Also, the upper beam 302 includes a nut plate at the upper surface that can be used to engage a seat mount, such as with a threaded fastener. Further, the upper beam includes weld location along the outboard side that can be welded to a rocker sill inner, such as shown in FIG. 15B.

Again, one or more of the beams forming the interlocking beam assembly may be formed with a metal sheet, which may be the same or different type of metal. For example, one or both of the metal sheets may include a martensitic steel with a tensile strength of at least 1,500 MPa, such as 1,500 MPa or 1,700 MPa. Further, the metal sheets may have a thickness of about 1.4 mm, and in some examples may be approximately between 1 mm and 1.8 mm or more generally between 0.8 mm to 3.0 mm. In additional examples, the rocker section and the inboard stiffening beam may have different shapes and orientations from that illustrated and may include alternative dimensions and proportions, such as for use with different types of vehicles.

Various concepts illustrated in the interlocking beam assemblies 100, 200, and 300, and components thereof, each include some like feature, such that duplicative description is omitted and like reference number incremented by the respective hundreds place are understood to describe the corresponding labeled features, unless explicitly shown or described to the contrary.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Also for purposes of this disclosure, the terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An interlocking beam assembly for a vehicle, the interlocking beam assembly comprising:
   a first beam defining a transverse cross-sectional shape extending continuously along a length of the first beam, the transverse cross-sectional shape having a plurality of hollow sections that each enclose an elongated cavity;
   wherein at least one of the plurality of hollow sections comprises a notch disposed transverse to the length of the first beam at a select portion of the length of the first beam, the notch defined at cut edges along side walls of the first beam; and a second beam extending substantially orthogonal to the first beam and attached in the notch in the first beam between the cut edges of the side walls of the notched hollow section, wherein the first beam comprises a left-side hollow section integrally formed with a right-side hollow section and a common wall shared by the left-side and right-side hollow sections.

2. The interlocking beam assembly of claim 1, wherein the second beam comprises a transverse cross-sectional shape extending continuously along a length of the second beam.

3. The interlocking beam assembly of claim 2, wherein the transverse cross-sectional shape of the second beam encloses a plurality of cavities along the length of the second beam, and wherein the second beam comprises a second notch disposed transverse to the length of the second beam, the second notch defined at cut edges along side walls of the second beam.

4. The interlocking beam assembly of claim 3, wherein the first notch of the first beam is attached in the second notch of the second beam.

5. The interlocking beam assembly of claim 1, wherein the first beam comprises a load path along the length of the first beam, and wherein the second beam bridges the load path across the notch in the first beam.

6. The interlocking beam assembly of claim 1, wherein the first beam is configured to extend along a width direction of the vehicle and the second beam is configured to extend along a length direction of the vehicle.

7. The interlocking beam assembly of claim 1, wherein the first beam comprises a metal sheet that is formed with bends along the length of the first beam to define the plurality of hollow sections.

8. The interlocking beam assembly of claim 7, wherein the metal sheet comprises (i) a central segment that forms the common wall between adjacent hollow sections and (ii) outer segments that integrally extend from opposing ends of the central segment of the metal sheet and are formed in the same rotational direction about the central segment to enclose the adjacent hollow sections of the first beam.

9. The interlocking beam assembly of claim 8, wherein the cut edges in the side walls of the first beam that form the notch are disposed at one of the outer segments of the metal sheet.

10. The interlocking beam assembly of claim 1, wherein an outer surface of the second beam is welded to the cut edges in the notch of the first beam.

11. An interlocking beam assembly for a vehicle, the interlocking beam assembly comprising:

an upper beam comprising an upper hollow section integrally formed with a lower hollow section and a common wall shared by the upper and lower hollow sections;

wherein a notch is disposed in the lower hollow section of the upper beam at a select portion along a length of the upper beam, the notch defined at cut edges along a bottom wall and side walls of the lower hollow section; and a lower beam having at least one hollow section attached in the notch of the upper beam between the cut edges of the side walls, wherein the lower beam comprises a left-side hollow section integrally formed with a right-side hollow section and a common wall shared by the left-side and right-side hollow sections.

12. The interlocking beam assembly of claim 11, wherein a second notch is disposed in the right hollow section of the lower beam at a select portion along a length of the lower beam, the second notch defined at cut edges along a right side wall and upper and lower walls of the right hollow section, and wherein the lower hollow section of the upper beam is configured to attach in the second notch between the cut edges of the right side wall.

13. The interlocking beam assembly of claim 11, wherein the upper beam comprises a transverse cross-sectional shape extending continuously along a length of the upper beam.

14. The interlocking beam assembly of claim 11, wherein the upper beam extends perpendicular to the lower beam with the upper beam configured to extend along a length direction of the vehicle and the lower beam is configured to extend along a width direction of the vehicle.

15. The interlocking beam assembly of claim 11, wherein the upper beam comprises a metal sheet that is roll formed to define the upper and lower hollow sections and the common wall shared between the upper and lower hollow sections.

16. The interlocking beam assembly of claim 15, wherein the metal sheet comprises (i) a central segment that forms the common wall between the upper and lower hollow sections and (ii) outer segments that integrally extend from opposing ends of the central segment of the metal sheet and are formed in the same rotational direction relative to the central segment to define the upper and lower hollow sections.

17. The interlocking beam assembly of claim 11, wherein the lower beam comprises a metal sheet that is roll formed to define at least one hollow section extending along a length of the lower beam.

18. An interlocking beam assembly for a vehicle, the interlocking beam assembly comprising:

a first beam having a metal sheet that is formed to define two adjacent hollow sections extending along a length of the first beam and each enclosing an elongated cavity;

wherein the metal sheet comprises (i) a central segment that forms a shared wall between the two adjacent hollow sections and (ii) outer segments that extend from opposing ends of the central segment of the metal sheet to form side walls of the two adjacent hollow sections, wherein a notched hollow section of the two adjacent hollow sections comprises a notch disposed transverse to the length of the first beam, the notch defined at cut edges along the side walls of the notched hollow section of the first beam; and a second beam attached in the notch of the first beam between the cut edges of the side walls of the notched hollow section, wherein the second beam comprises a second metal sheet that is formed to define two adjacent hollow sections extending along a length of the second beam, wherein a second notched hollow section of the two adjacent hollow sections comprises a second notch disposed transverse to the length of the second beam, and wherein the first beam is attached in the second notch of the second beam.

* * * * *